United States Patent Office 3,810,975
Patented May 14, 1974

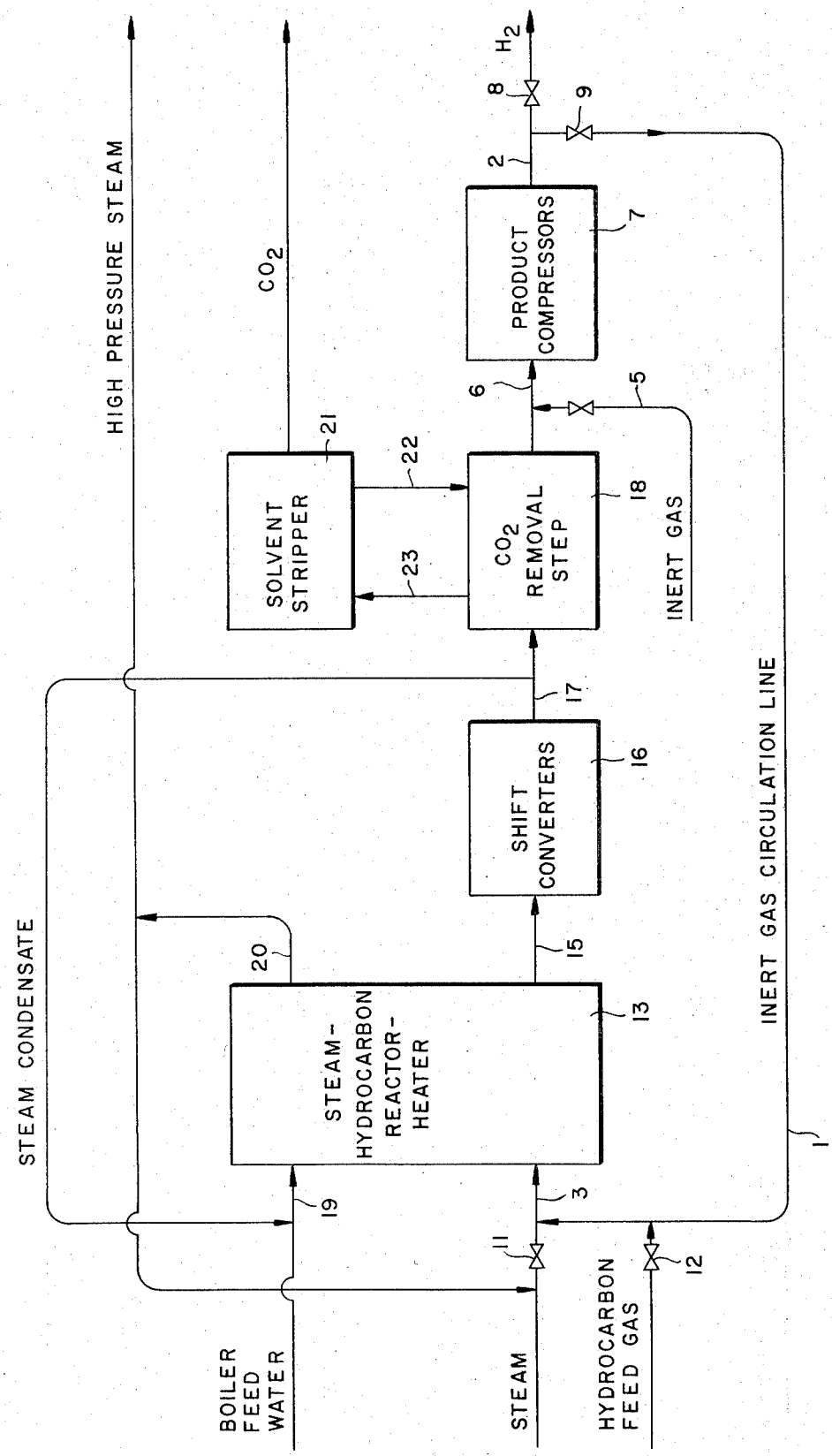

3,810,975
START-UP PROCEDURE FOR CATALYTIC STEAM REFORMING OF HYDROCARBONS
Chester B. Brooke, East Alton, Ill., assignor to Shell Oil Company, Houston, Tex.
Filed Oct. 15, 1971, Ser. No. 189,577
Int. Cl. C01b *1/18, 1/32*
U.S. Cl. 423—652                         5 Claims

ABSTRACT OF THE DISCLOSURE

A process for catalytic steam reforming of hydrocarbons to produce hydrogen, carbon monoxide and carbon dioxide from steam and a gaseous hydrocarbon mixture in a system including an inlet reactor-heater, catalyst-filled tubes, a hydrogen product compressor, and a valved conduit between the discharge side of the hydrogen compressor and the inlet to the reactor-heater is started up by introducing an inert gas into the system, circulating said inert gas through the system with the hydrogen product compressor by passing it back to said reactor-heater, heating the catalyst-filled tubes to a temperature above the dew point of steam while circulating inert gas, introducing steam and hydrocarbons into the system, stopping the inert gas circulation by closing the valve in the conduit and removing hydrogen product from the system with the compressor.

BACKGROUND OF THE INVENTION

Field of the invention

The present invention relates to a process for the production of hydrogen by catalytic steam reforming of hydrocarbons and more particularly, to a method for starting up and shutting down said process.

Prior art

Catalytic steam reforming of hydrocarbon gases such as methane, ethane, propane, etc., and mixtures thereof to produce hydrogen, carbon monoxide and carbon dioxide are well known. For example, such a process is described in the periodical Chemical Engineering, September 1950, pp. 104–106. This article describes a process wherein propane and steam are reacted to produce a mixture of hydrogen, carbon monoxide and carbon dioxide. Hydrocarbon and steam feed gas pass through a mixing chamber and to heater tubes, containing a nickel catalyst, which are maintained at temperatures of 1600–1800° F. by the combustion of additional propane in chambers surrounding the tubes. Steam reacts with propane in the tubes. The resulting gas is 70–75% hydrogen with the balance largely carbon dioxide and carbon monoxide with a trace of methane. Effluent from the heater is subsequently passed into a first-stage shift converter containing beds of iron oxide catalysts. There the CO reacting with steam is converted to $CO_2$ and more $H_2$. Steam is condensed from the process and an absorbent for acid gas is generally used to remove $CO_2$ from the product hydrogen.

The hydrocarbon-steam reaction $CH_4+H_2O=CO+3H_2$ can be made to approach equilibrium over a wide range of temperatures and pressures by selecting the proper operating conditions. This reaction has been carried out at pressures from near atmospheric to above 300 p.s.i.g. and at steam to carbon molar ratios of about 1.8 to greater than 10.

Several catalysts are commercially available for the steam hydrocarbon reaction and for the CO—$CO_2$ shift reaction. The principal constituents of commercially available reforming catalysts include nickel oxide, alumina, silica, iron oxide, calcium oxide and magnesium oxide. Operating conditions which result in the impingement of liquid water on the catalyst should be avoided since catalyst breakage and excessive pressure drop usually result. The shift conversion reaction is generally accomplished in two stages at high and low temperatures. Catalysts for the shift reaction include iron oxide and copper oxide. These catalysts can also be damaged by contact with water. Consequently, it is necessary to heat the system above the dew point of steam at reaction conditions to ensure that condensation does not occur.

On new plants, moisture in the refractory lining of the heater, refractory lined pipe and high-temperature heat exchanger must be slowly and carefully removed to avoid damage to the refractory. Typically, catalyst damage is avoided and the refractory is protected by injecting air or natural gas on a once-through basis and firing the heater until the desired amount of drying is accomplished. However, since the volume of gas required to ensure uniform flow distribution in the catalyst-filled heater tubes (numbering perhaps over 200 depending on heater design) is very large, e.g., about 8000 s.c.f. per minute, usually an auxiliary compressor must be installed to supply the required volume. If air is injected initially, it is necessary to replace the air with natural gas or inert gas when the temperature is increased to about 300° F. where undesirable oxidation could occur. When temperatures above 400–500° F. are obtained, process steam can be used. Natural gas also requires design steam to gas ratio at temperatures above 400° F.

Where an external steam source is available, steam is generally injected at the earliest opportunity after the system is above the steam dew point. The system is then brought up to operating temperatures and a heat balance is established before hydrocarbon gases are introduced. This kind of start-up procedure can be very costly.

A particularly active low-temperature shift catalyst contains copper oxide which must be reduced to metallic copper to establish full activity. This is generally accomplished by contacting the catalyst with hydrogen at a temperature of about 400° F. When a "wet" reduction, i.e., in the presence of steam, is practiced catalyst life is about 1 year. It is estimated that catalyst life can be increased by 30% for "dry" reduction. Since low-temperature shift catalyst can cost about $100,000 per charge in many commercial processes, such an extension of catalyst life would be worth about $25,000 per year. A "dry" catalyst reduction can be employed using an inert gas, e.g., nitrogen as the carrier and hydrogen as the reducing gas. This procedure is facilitated by using the start-up procedure of the invention.

SUMMARY OF THE INVENTION

The disadvantages of the above-described start-up procedures in a steam hydrocarbon reforming process can be overcome by providing a valved conduit from the hydrogen product compressor discharge to the steam-hydrocarbon reactor-heater inlet, introducing an inert gas into the system including a steam-hydrocarbon reactor-heater, catalyst-filled tubes, a hydrogen product compressor circulating said inert gas through the system with the hydrogen product compressor by passing it back to the inlet of said reactor-heater, firing the heater to increase the catalyst temperature above the dew point of steam while circulating inert gas, preferably until the system has reached normal operating temperatures, introducing steam and hydrocarbon gases into the system, then stopping inert gas circulation and removing hydrogen product from the system with the compressor.

BRIEF DESCRIPTION OF THE DRAWING

The drawin shows a schematic flow diagram of a typical catalytic steam-hydrocarbon reforming process embodying this invention. The present process for start-up will be more fully described by reference to the reforming system shown in the drawing.

DESCRIPTION OF THE INVENTION

Since catalytic steam-hydrocarbon reformers produce hydrogen at pressures ranging between about 50–500 p.s.i.g. and the product hydrogen from such processes is frequently desired at much higher pressures, e.g., 1000–2500 p.s.i.g. for such operations as hydrocracking, these processes generally contain at least one product compressor for raising the pressure of hydrogen to higher pressures as desired. It is to such units that this invention is applicable.

The present process for bringing the catalytic steam hydrocarbon reformer on stream is applicable to both the initial process start-up when it is necessary to dry out and cure the refractory lining inside the heater and process coolers, as well as subsequently for routine maintenance start-ups and shut-downs. To provide a better understanding of the invention, reference will now be made to the accompanying drawing, which contains a schematic diagram of a typical steam-hydrocarbon reforming unit. A suitable valved inert gas conduit 1 is added to said unit from the $H_2$ product compressor discharge line 2 to the steam-hydrocarbon reactor-heater inlet line 3 and is used to circulate large volumes of inert gas through the system. A valved conduit 5 is used to introduce an inert gas into the unit, preferably at the product compressor inlet line 6. An inert gas, e.g., $CO_2$ or nitrogen, is introduced into the system through conduit 5 until a suitable pressure is reached, e.g., about 100 p.s.i.g. A valve 8 in hydrogen product line 2 is closed, inert gas circulation valve 9 is opened, process steam valve 11 is closed and hydrocarbon feed gas valve 12 is closed. The product compressor 7 is started and inert gas is circulated through the unit at maximum volume. Boiler feed water is introduced into a waste heat boiler section of the reactor-heater through conduit 19 where it is converted to high pressure superheated steam, e.g., about 300 p.s.i.g., by firing the heater. Steam thus generated can be passed to a high pressure steam system if such is available, or can be used to supply start-up steam to the steam-hydrocarbon reforming process through valve 11 and line 3 if alternative sources of steam are not available. When inert gas and boiler feed water circulation are established, steam hydrocarbon reactor-heater 13 is fired and the catalyst temperatures in both the reforming reactor and the shift converter are increased at about 75° F./hour. The heating rate will, of course, be much lower when drying out heater and process cooler refractory at initial start-up, as will be explained later. Circulating inert gas is passed from reactor-heater 13 through conduit 15 to shift converters 16 which contain catalyst suitable for converting CO to $CO_2$ during process operation. The circulating gas is then routed through conduit 17 to a carbon dioxide removal step 18 which is generally accomplished by contacting process gas containing primarily hydrogen, $CO_2$ and small quantities of methane with a suitable solvent for absorbing $CO_2$, e.g., sulfinol or monoethanolamine. From this step, the circulating inert gas is routed through conduit 6 back to the product compressor, thus completing the cycle. By circulating inert gas through the system until the temperature is above the dew point of steam, water damage to the catalyst is avoided and expensive inert gas is conserved. Preferably, however, a heat balance is established in the system prior to feed cut-in, thus minimizing system upsets.

The solvent recovery system is started up prior to steam or feed cut-in by providing heat to the solvent stripper 21 by circulating solvent via conduit 22 through $CO_2$ removal step 18 and back to the stripper via conduit 23. By having the solvent stripper at operating temperature when steam and hydrocarbons are introduced to the unit, $CO_2$ can be immediately removed from the shift converter effluent when steam and hydrocarbons are introduced, thereby reducing the time required to establish specification hydrogen product.

After the catalyst has been heated to the desired temperature, e.g., about 1250° F. heater outlet, while circulating inert gas, preferably nitrogen, steam is introduced by opening valve 11. Inert gas circulation is stopped by closing valve 9. Hydrocarbon feed gas, which may be mixed with hydrogen, is then introduced into the system by opening valve 12. Hydrogen product valve 8 is also opened, thereby utilizing the compressor to remove hydrogen product from the system.

In addition to minimizing utility costs and avoiding temperature limitations, the process of the invention has the following advantages:

1. Pressure is available to establish solvent circulation from the $CO_2$ removal step to the solvent regenerator.
2. When solvent circulation is established, a heat sink is available to condense process steam in a solvent regenerator reboiler.
3. The solvent regenerator can be heated to operating temperatures before introducing hydrocarbon feed gas, resulting in a smoother start-up.
4. Low temperature shift CuO catalyst can be reduced by adding hydrogen to the circulating inert gas stream.
5. Air or combustible gases are not present in the system during the start-up period.
6. Minimizes evacuation of process equipment and resulting pressure upsets, e.g., to the solvent circulation system.

EXAMPLE

The following is a procedure to be followed for the initial dryout of a steam-hydrocarbon reforming reactor-heater and refractory-lined process gas cooler. A steam drum and steam production system on the heater will be treated at the same time as the dryout.

1. With nitrogen being circulated through the heater, high temperature shift converter, etc., back to the compressors and the steam generating system in service, light sufficient burners in the heater to raise the temperature from ambient to 250° F. at 50° F./hour.
2. Follow the heater dryout schedule outlined in Table I, noting dryout limitations of the refractory in the process gas cooler as well as the heater.
3. Increase the number of burners in service as required to maintain fire-box temperatures below the steam coils in the heater as shown in Table I.
4. During this initial drying period, circulate boiler feed water through the steam generation system to prevent overheating of the tube metal. Either the heater or process gas cooler may be limiting at any temperature level and may require holding temperatures at various levels longer than listed in Table I.
5. Normally, after heating for the time shown, brick work and insulation will then be dry enough to permit placing the heater in operation.

TABLE I.—STEAM-HYDROCARBON REFORMER DRYOUT SCHEDULE

| Heating sequence | Heater | | | Process gas cooler | | |
|---|---|---|---|---|---|---|
| | Stack temperature, °F. | Rate of increase, degrees/hr. | Hours | Inlet temperature, °F. | Rate of increase, degrees/hr. | Hours |
| Ambient to | 250 | 50 | 4 | 250 | 50 | 4 |
| Hold at | 250 | | 48 | 250 | | 12 |
| 250° F. to | 300 | 50 | 1 | 400 | 20 | 7.5 |
| Hold at | 300 | | 23 | 400 | | 6 |
| 300° F. to | 400 | 5 | 20 | | | |
| Hold at | 400 | | 4 | | | |
| 400° F. to | 500 | 5 | 20 | 600 | 20 | 10 |
| Hold at | 500 | | 28 | 600 | | 12 |
| 500° F. to | 750 | 50 | 5 | | | |
| Hold at | 750 | | 24 | 1,000 | 50 | 8 |
| 750° F. to | 1,000 | 50 | 5 | | | |
| Hold at | 1,000 | | 24 | 1,000 | | 6 |
| 1,000° F. to | Operating | 50 | 10 | Operating | 50 | 10 |
| Total | | | [1] 216 | | | [2] 75.5 |

[1] Hours=9 days.
[2] Hours=3.2 days.

The foregoing disclosure of the invention is not considered limiting since many variations can be made by those skilled in the art without departing from the scope or spirit of the appended claims.

What is claimed is:

1. In a catalytic process for producing high-pressure hydrogen in a system comprising a reactor-heater containing catalyst in tube for reacting steam and hydrocarbon gas to form $H_2$, CO and $CO_2$, a shift converter containing catalyst for converting CO to $CO_2$, an absorber containing a solvent for separating $CO_2$ from $H_2$, a solvent stripper for separating $CO_2$ from said solvent, at least one compressor, and a valved conduit between the $H_2$ compressor discharge and the reactor-heater inlet, the improvement which comprises:
   (a) introducing an inert gas into said system until a suitable superatmospheric pressure is reached for operating said $H_2$ compressor;
   (b) circulating said inert gas through said system with said $H_2$ compressor;
   (c) firing said reactor-heater while circulating said inert gas until the temperatures of said catalysts are above the dew point of steam to prevent damaging said catalysts by liquid water condensing from reaction gases;
   (d) introducing steam and hydrocarbon gas into said system after said catalysts have reached the desired temperature;
   (e) stopping the inert gas circulation by closing the valve in said valved conduit; and
   (f) operating said system to produce $H_2$ and $CO_2$.

2. The process of claim 1 wherein said inert gas is nitrogen.

3. The process of claim 1 wherein boiler feed water is charged to a waste-heat boiler located in the reactor-heater before step (c), thereby generating the steam introduced into the system in step (d).

4. The process of claim 1 wherein said inert gas is circulated until the system is heated to process operating temperatures before introducing steam and hydrocarbon gases.

5. The process of claim 1 wherein the inert gas is nitrogen and said inert gas is circulated until said system is heated to process operating temperatures before introducing steam and hydrocarbon gases.

References Cited

UNITED STATES PATENTS

| | | | |
|---|---|---|---|
| 1,988,759 | 1/1935 | Svanoe | 423—652 |
| 2,813,779 | 11/1957 | Faatz, Jr. | 423—652 |
| 3,361,534 | 1/1968 | Johnson et al. | 423—653 |
| 3,656,905 | 4/1972 | Smith et al. | 423—653 |

EDWARD STERN, Primary Examiner

U.S. Cl. X.R.

423—653; 252—373